United States Patent [19]

Landis, Jr. et al.

[11] 4,361,213

[45] Nov. 30, 1982

[54] VIBRATION DAMPER RING

[75] Inventors: Delmer H. Landis, Jr., Loveland; Malachi Lawrence, Jr., Cincinnati, both of Ohio

[73] Assignee: General Electric Company, Cincinnati, Ohio

[21] Appl. No.: 152,237

[22] Filed: May 22, 1980

[51] Int. Cl.³ .............................................. F16F 7/10
[52] U.S. Cl. ................................. 188/378; 74/574; 416/500
[58] Field of Search ............... 188/218 A, 378, 379, 188/380, 381; 74/574; 415/119; 416/190, 198, 500

[56] References Cited
U.S. PATENT DOCUMENTS

| | | | |
|---|---|---|---|
| 1,925,072 | 8/1933 | Griswold | 74/574 |
| 2,901,290 | 8/1959 | Loofbourrow | 74/574 |
| 2,956,774 | 10/1960 | Stalker | 416/500 |
| 3,319,929 | 5/1967 | Lawrence | 416/500 |
| 3,435,925 | 4/1969 | Harrison | 188/218 A |
| 3,448,830 | 6/1969 | Desmond | 74/574 |
| 3,589,475 | 6/1971 | Alford | 416/500 |
| 3,671,140 | 6/1972 | Shank | 416/500 |

*Primary Examiner*—Duane A. Reger
*Attorney, Agent, or Firm*—Francis L. Conte; Derek P. Lawrence

[57] ABSTRACT

A damper ring for damping vibration of a structural member. The damper ring includes an annular recess for receiving an extension, such as a flange, of the structural member and can include radially extending tabs to restrict relative axial movement. The damper ring is preferably severed to allow it to be retained radially against the extension of the structural member.

14 Claims, 5 Drawing Figures

VIBRATION DAMPER RING

BACKGROUND OF THE INVENTION

1. Field of the Invention

This invention relates to means for damping vibration of structural members.

2. Description of the Prior Art

Seals are often employed within an engine to prevent fluid from leaking from one section of the engine to another. Such seals are commonly located between a stationary structural member and a moving structural member of the engine and can be carried by either member. When relative movement between structural members occurs, a form of wave motion, known as vibration, can develop in either structural member, but particularly in the one carrying the seal. The type and degree of vibration which develops depends upon such factors as engine speed and the design of the structural member itself.

In a turbine engine, seals are often carried on and can be integral with an annular rotating structural member, with the seal occasionally contacting or operating with small clearances with respect to an annular stationary structural member, called a stationary seal. The annular structural member is frequently of thin-walled construction, for weight and cost saving reasons, and therefore is very susceptible to vibration, such as circumferentially propagating flexural vibration and axially propagating vibration. Vibration of the structural member not only can result in lower engine efficiency, due to loss of effective sealing, but can also result in destructive fatigue or cracking of the seal or structural member. Means which reduce, or damp, such vibration are thus desirable in order to maintain engine efficiency and increase the useful life of the structural member.

One such means commonly used for damping vibration of an annular structural member is a damper ring. A damper ring is usually annular and concentric with the structural member and can be disposed either radially outward or radially inward of the structural member. It is normally held against the structural member in suitable manner.

For reasons to be explained hereafter, the damping effectiveness of a damper ring increases with an increase in distance between the neutral axis of the damper ring and the neutral axis of the structural member to be damped. The neutral axis of a body is the axis formed by the points of zero stress in the body. On one side of the neutral axis, the body is subject to tensile stress, while simultaneously on the other side of the neutral axis, the body is subject to compressive stress. Such stresses within the body become greater as the distance from the neutral axis increases. For example, at the interface between a radially inner surface of a structural member and a damper ring, during periods of vibration, the structural member will be in compression while the damper ring will be in tension. By increasing the distance between neutral axes, the compressive stresses of the structural member and the tensile stresses of the damper ring at the interface of the structural member and damper ring are also increased. Because of the resulting greater differential between the compressive stresses of the structural member and the tensile stresses of the damper ring, slip is promoted. Slip is the relative tangential movement between the damper ring and the structural member. When the structural member vibrates, the damper ring does not follow the vibration but rather slips or slides tangentially relative to the structural member. As a result of frictional effects, such relative movement produces heat and thereby promotes energy dissipation. That is, slip causes the energy of vibration to be dissipated in the form of heat. Thus, by increasing the distance between the neutral axis of the damper ring and the neutral axis of the structural member, slip, and thereby damping effectiveness, is increased.

Most currently used damper rings are located adjacent or almost adjacent the structural member which is to be damped. For example, some structural members include a groove, or ring trap, within themselves into which the damper ring fits. This results in the neutral axes of the damper ring and the structural member being relatively close to each other. Damping effectiveness is thereby decreased. Furthermore, thermal sinks, vibration stiffeners, or other devices are often added to the structural member. These devices are normally radially extending flanges of the structural member itself. When the damper ring is disposed on the same side of the structural member as are the aforementioned devices, the neutral axes of the damper ring and the structural member are brought even closer together, with a corresponding decrease in damping effectiveness.

Another problem which is encountered with damper rings is retaining them in a proper location and position relative to the structural member, while at the same time permitting ease of installation and replacement. Both axial movement and radial movement of the damper ring must be prevented, while, as previously indicated, relative tangential movement, or slip, between the damper ring and the structural member must be permitted. Although prior art damper rings have been constructed of metal and severed axially to meet some of the above requirements, none are known to have met all of those requirements as successfully as does the present invention.

In view of the above-mentioned problems, it is therefore a primary object of the present invention to provide new and improved means for effectively damping vibration of a structural member.

Another object of the present invention is to provide a damper ring which promotes slip between it and the structural member.

Still another object of the present invention is to provide a damper ring which can be retained in its proper location and position and yet which is easy to install and replace.

SUMMARY OF THE INVENTION

The present invention comprises means for damping vibration of a structural member and includes a damper ring having an annular recess for receiving an extension, such as a flange, of the structural member and thereby mounting the damper ring on the structural member.

In one particular embodiment of the invention in which the damper ring is disposed radially inward of the flange of the structural member, the damper ring is metallic and severed or split, thereby allowing it to be retained radially against the flange. The damper ring can further include means, such as radially extending tabs, for restricting relative axial movement between it and the flange of the structural member.

The damper ring can be of any desired cross-sectional shape. Preferably, that shape corresponds to the shape of the extension or flange of the structural member which it receives.

BRIEF DESCRIPTION OF THE DRAWING

This invention will be better understood from the following description taken in conjunction with the accompanying drawing wherein.

DESCRIPTION OF THE PREFERRED EMBODIMENT

Figure 1:
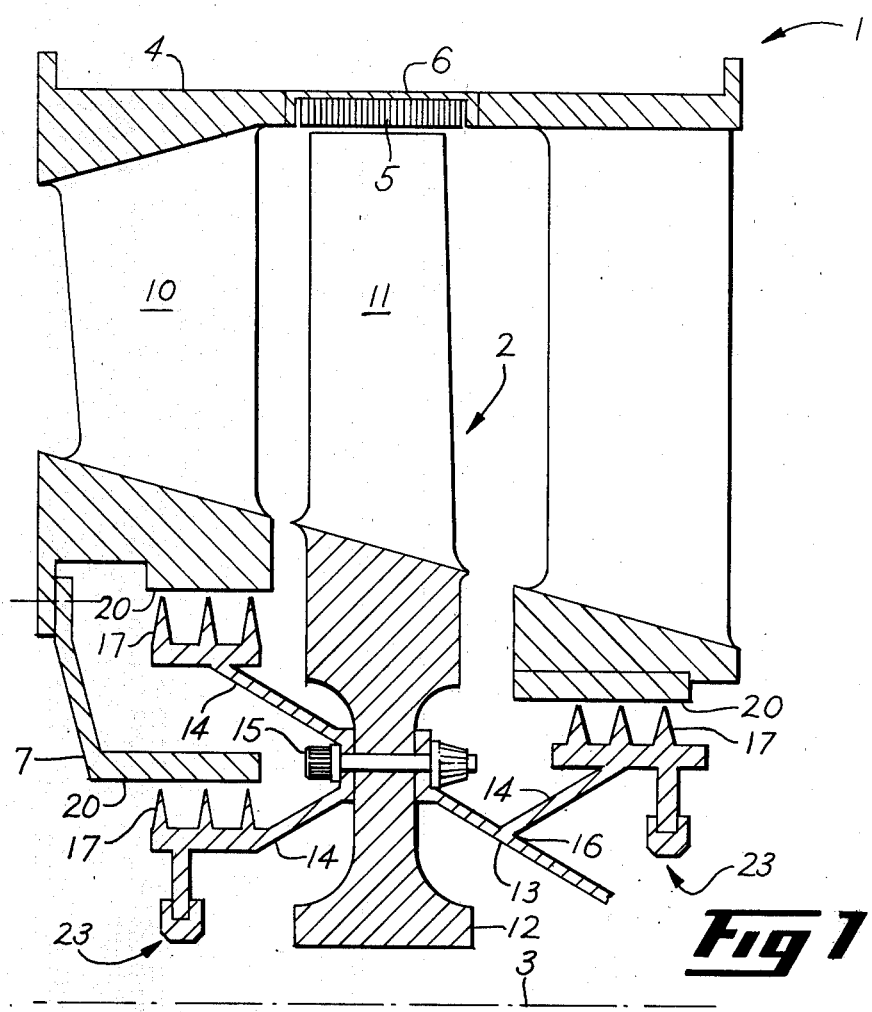
FIG. 1 is a fragmentary cross-sectional view of the upper half of the turbine section of a gas turbine engine, incorporating an embodiment of the present invention.

Referring now to FIG. 1, there is shown an arrangement of certain components of a typical gas turbine engine wherein the present invention can be effectively utilized. It is to be understood, however, that although the present invention is described as being used in the turbine section of a gas turbine engine, that is only one example of a suitable use. The invention is equally applicable for damping vibrations in other sections of a gas turbine engine as well as in other types of machinery wherein vibrations are encountered. Also, although the term "flange" frequently is used herein for convenience of understanding and because it is a preferred application for the present invention, the term "flange" is intended to include within its meaning any extension, such as a ridge or protuberance, upon which the damper ring can be mounted.

FIG. 1 shows a section of the upper half of the turbine of a gas turbine engine. The turbine comprises a stator assembly 1 and a rotor assembly 2. When the engine is operating, the stator assembly 1 remains fixed while the rotor assembly 2 rotates relative to the stator assembly about the engine longitudinal axis, depicted by the broken line 3.

The stator assembly 1 comprises an annular nozzle outer support 4, an annular shroud 5 and a shroud support 6, an annular nozzle inner shroud 7, and a plurality of circumferentially spaced nozzle vanes 10 around the turbine between the nozzle outer support 4 and the inner shroud 7.

The rotor assembly 2 comprises a plurality of circumferentially spaced blades 11 joined to an annular disc 12. Extending from various locations on the rotor assembly 2 are structural members, such as an annular shaft 13 and annular seals 14, all of which rotate with the rotor assembly 2. The annular shaft 13 and the seals 14 are secured to the rotor assembly 2 or to each other by any suitable means, such as, for example, by bolting, as at 15, or by bonding, or alternatively they can be integral, as at 16, where the seal 14 is integral with the annular shaft 13. A structural member, such as the seal 14, can include annular teeth or serrations 17, each of which is in a sealing relationship with an annular sealing surface 20. The function of each seal 14 is to prevent fluid leakage from one side of the seal to the other. Although the seals 14 are described as being carried on rotating structural members and the sealing surfaces 20 as being carried on stationary structural members, it is to be understood that the seals can conversely be carried on stationary structural members while the sealing surfaces are carried on rotating structural members.

Different types of annular seals 14 can be used to prevent fluid leakage, and the present invention is adaptable to be utilized with various types thereof. One of the more common seals, however, and one which will be used as an example to illustrate the present invention, is a labyrinth seal. Labyrinth seals are frequently employed to form a fluid seal between rotating and stationary members, as between the rotor assembly 2 and the stator assembly 1. As can best be seen in FIG. 2, such a labyrinth seal 14 comprises a plurality of axially spaced annular teeth 17 which extend into a sealing relationship with a sealing surface 20. The sealing surface 20 can be any surface which is either stationary or which rotates at a rotational speed different from that of the rotor assembly 2, but preferably is a part of the stator assembly 1. Thus, as the rotor assembly 2 rotates, the labyrinth seal 14 also rotates and the teeth 17 of the labyrinth seal remain in close clearance with the sealing surface 20, occasionally sliding or rubbing.

Due to the rotation of rotor assembly 2, and also due to other factors such as pressure variations across the seals 14, a form of wave motion, known as vibration, can develop in the structural members, particularly the seals. Vibration can be destructive of the structural members if left unchecked. Different types of vibration can occur in the structural members, such as, for example, circumferentially propagating flexural vibration and axially propagating vibration. Structural members, such as the seal 14, are generally of a thin-walled construction in order to reduce weight and cost. Because of their thin-walled construction, such structural members are particularly susceptible to vibration.

Referring again to FIG. 2, the structural member can include a protruding extension, or flange. Such an extension can be integral with or can be securely attached to the structural member. The flange, as shown in the drawing, is preferably annular and concentric with the structural member from which it extends. For example, an annular flange 22 can extend from the labyrinth seal 14. The annular flange 22 can, for example, be a vibration stiffener, a thermal sink, or can have any other desired purpose.

The present invention comprises a damper ring 23 having an annular recess 24 therein. The annular recess 24 receives, and therefore faces, the flange of the structural member, such as the annular flange 22. In the embodiment shown in FIGS. 2 and 3, the annular recess 24 faces radially outward, inasmuch as the flange 22 extends radially inward. However, the damper ring can also be effectively used with the annular recess facing radially inward when the flange 22 extends radially outward. Furthermore, although the damper ring 23 of the present invention is described as engaging a flange of a rotating structural member, it can also be successfully employed to damp vibration of a non-rotating structural member.

The damper ring 23 can have any desired cross-sectional shape. However, the annular recess 24 which is defined by the cross-sectional shape of the damper ring preferably conforms to the cross-sectional shape of the extension or flange of the structural member which it receives. One example of such a shape can be seen in FIGS. 2 and 3 wherein the damper ring 23 has a generally U-shaped cross section defined by a base portion 23a and sidewalls 25. Such a U-shaped recess is preferable when the flange of the structural member has a generally rectangular shape.

Figure 4:
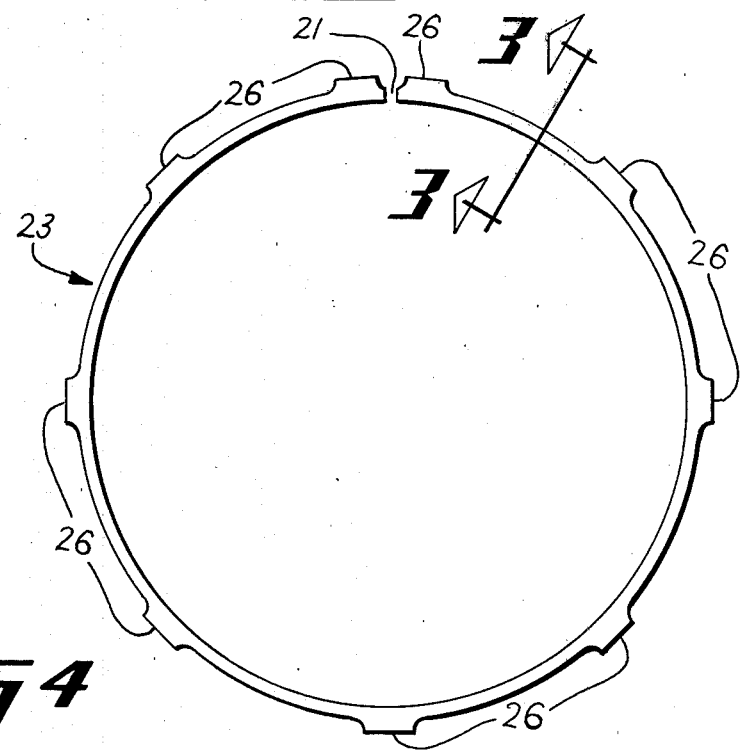
FIG. 4 is front view of a representative damper ring of the present invention.

As can best be seen in FIG. 4, the damper ring 23 is annular or circular. Preferably, the damper ring 23 is severed or split, as at 21. Severing enables diametral expansion and contraction of the damper ring to take place. That is, the diameter of the damper ring 23 can be decreased by applying forces to it directed radially inward, and the diameter can be increased by applying forces to it directed radially outward. This permits ease of installation or replacement. More importantly, severing of the damper ring 23 allows centrifugal force to expand the diameter of the damper ring during rotation sufficiently to retain it radially more securely against the flange 22 of a rotating structural member. Additionally, the severed ring has inherent spring tension which assists in retaining the damper ring radially against the flange 22, particularly when the structural member is not rotating.

The damper ring 23 can be fabricated of any material suitable for the environmental conditions to which it will be subjected. When used in a gas turbine engine, for example, the damper ring is preferably metallic. One example of an especially suitable metal in a gas turbine is a nickel-base superalloy, commercially available as "INCONEL 718" alloy from Huntington Alloy Products Division, International Nickel Company, Inc.

Figure 2:
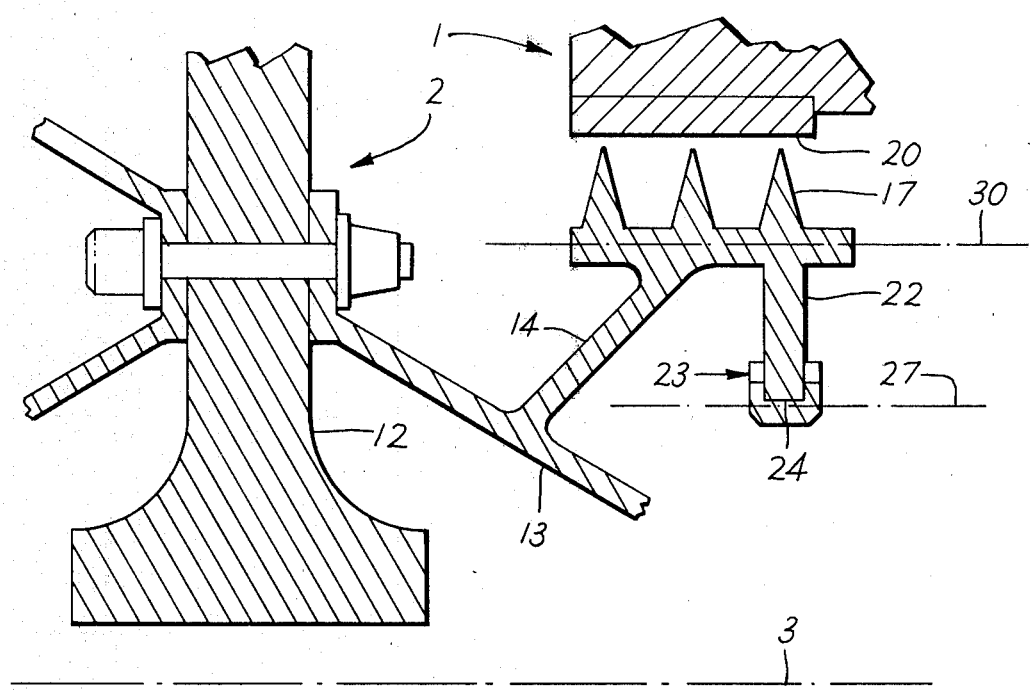
FIG. 2 is an enlarged fragmentary cross-sectional view of that portion of the turbine section incorporating the present invention.

When the damper ring 23 is disposed radially inward of the annular flange 22, as is shown in FIG. 2, and is dimensional such that the diameter of the damper ring, in its unexpanded condition, is slightly less than the diameter of the inner edge of the annular flange 22, centrifugal force during rotation and spring tension during both rotation and non-rotation will exert radially outwardly-directed forces on the damper ring 23 sufficient to retain it in a mounted position on the flange 22, with the inward edge of the annular flange 22 received by the annular recess 24. If the damper ring 23 were disposed radially outward of a flange of a structural member, centrifugal force and spring tension would still exert a force directed radially outward and would thus urge the damper ring to disengage itself from the flange of a rotating structural member. Other means (not shown) would then be required to retain the damper ring radially on the flange. Furthermore, if the damper ring is arranged to be mounted on a non-rotating structural member, centrifugal force would not be available to retain it radially on a flange of the structural member. In that case, spring tension can be supplemented with other retaining means (not shown) to retain the damper ring radially. Preferably, the spring tension force in the damper ring 23 shall be such as to optimize the energy dissipation effects of slip, to be discussed hereinafter.

Figure 3:
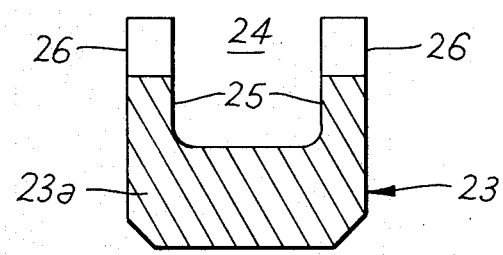
FIG. 3 is a cross-sectional view of a representative damper ring of the present invention taken along line 3—3 of FIG. 4.

Relative axial movement between the damper ring 23 and the flange 22, that is, movement parallel to the engine longitudinal axis 3, is restricted to some extent when the damper ring 23 has a generally U-shaped cross section because the sidewalls 25 of the damper ring 23 extend adjacent the sidewalls of the flange 22 when the two are engaged. Obviously, the greater the extension of the sidewalls 25, the more effective will be the restriction of axial movement. However, means can be provided other than or in addition to the sidewalls 25 to restrict relative axial movement. For example, in certain configurations of the damper ring 23, weight and cost can be reduced, slip can be promoted, and better axial movement restriction can be achieved by additional restricting means. One example of such means for further restricting relative axial movement is shown in FIGS. 3 and 4 and comprises at least one, and preferably a plurality of, tabs 26 spaced circumferentially around the damper ring 23 and extending radially and adjacent the sides of the annular flange 22 from each sidewall 25 of the damper ring 23. Although nine such pairs of tabs 26 are shown in FIG. 4, the number can be varied as desired. A plurality of spaced tabs 26 is preferable to a continuous flange extending radially from the sidewalls 25 the same distance as do the tabs 26. The former arrangement results in the neutral axis of the damper ring 23 being closer to the base portion 23a than does the latter arrangement. The significance of this will be discussed shortly. If desired, the tabs 26 can be crimped against the sides of the flange 22 to provide a greater degree of axial movement restriction. Such crimping would also restrict relative radial movement between the damper ring and the flange. Preferably, the degree of frictional engagement between the sidewalls 25 and the flange 22 and between the tabs 26 and the flange 22 should be such as to optimize slip, to be discussed hereinafter.

As indicated earlier, an important factor in damping vibration of a structural member is slip. Slip is relative tangential movement between the damper ring 23 and the flange of the structural member, such as the flange 22. As a result of friction between the damper ring and the flange, slip produces heat and thereby promotes energy dissipation. Thus, at least some of the energy of the vibration of the structural member can be dissipated by slip.

Figure 5:
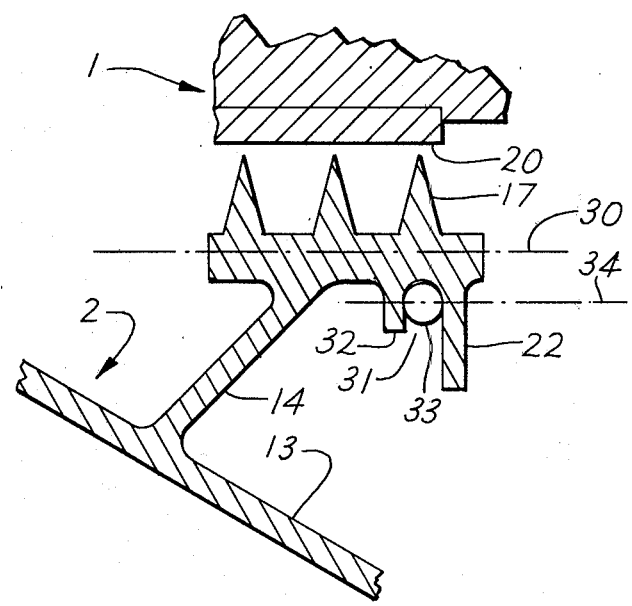
FIG. 5 is an enlarged fragmentary cross-sectional view of a prior art arrangement of a damper ring.

As also indicated earlier, as the distance between the neutral axes of the damper ring and the structural member increases, slip, and thus damping effectiveness, increases. Referring now to FIG. 2, the neutral axis of the damper ring 23 is depicted by the dashed line 27 and the neutral axis of the structural member, in this case the annular seal 14 including the annular teeth 17, is depicted by the dashed line 30. For comparison purposes, reference is now made to FIG. 5, which shows a typical prior art damper ring arrangement. For ease of description, the same numerals are used in FIGS. 2 and 5 to identify common elements. FIG. 5 shows the annular seal 14, the annular teeth 17, and the flange 22 in the same arrangement as that shown in FIG. 2. However, an annular ring trap 31 is shown as defined between the annular flange 22 and a smaller annular extension 32. An annular damper ring 33 having a circular cross-sectional shape is shown disposed within the ring trap 31. The neutral axis of the structural member, in this case the annular seal 14 including the annular teeth 17, is again depicted by the dashed line 30. The neutral axis of the prior art damper ring 33 is depicted by the dashed line 34. Comparing the distance between the neutral axes 30 and 34 of the typical prior art damper ring arrangement shown in FIG. 5 with the distance between the neutral axes 30 and 27 of the damper ring arrangement of the present invention shown in FIG. 2, it is clear that the damper ring arrangement of the present invention has increased the distance between neutral axes. As a result of the increased distance between neutral axes, slip is increased and thus the damping effectiveness of the damper ring 23 is increased over that of the prior art damper ring arrangement.

The present invention is not limited to the particular embodiment disclosed, and it is intended to cover all modifications coming within the true spirit and scope of the invention as claimed.

What is claimed is:

1. Means effective for damping vibration of an annular structural member including a neutral axis and an annular extension protruding only radially from said structural member, comprising a damper ring having a neutral axis and only a radially facing, annular recess therein for receiving said extension, and thereby mounting said damper ring on said structural member for radially spacing said neutral axes of said structural member and said damper ring.

2. The damping means of claim 1 wherein said extension comprises a flange.

3. The damping means of claim 1, wherein said damper ring is of a generally U-shaped cross section.

4. The damping means of claim 1, wherein said damper ring is severed for enabling diametral expansion and contraction thereof.

5. The damping means of claim 1, wherein said damper ring is metallic.

6. The damping means of claim 2, wherein said damper ring further comprises means for restricting relative axial movement between said damper ring and said flange of said structural member.

7. The damping means of claim 6, wherein said means for restricting relative axial movement comprises at least one tab extending radially from said damper ring and adjacent said flange of said structural member.

8. Means effective for damping vibration of an annular structural member including a neutral axis and an annular flange extending only radially from said structural member, comprising a metallic damper ring severed for enabling diametral expansion and contraction thereof, said damper ring having a neutral axis and only a radially facing, annular recess therein for receiving said flange and thereby mounting said damper ring on said structural member for radially spacing said netural axes of said structural member and said damper ring, and having a plurality of tabs extending radially therefrom and adjacent said flange for restricting relative axial movement between said damper ring and said flange.

9. The damping means of claim 8, wherein said damper ring is of a generally U-shaped cross section.

10. Means effective for damping vibration of a rotatable, annular structural member including a neutral axis and an annular flange extending radially inwardly from said structural member, comprising a metallic damper ring severed for enabling diametral expansion and contraction thereof, having a neutral axis and only a radially outwardly facing, annular recess therein for receiving said flange and thereby mounting said damper ring on said rotatable structural member for radially spacing said neutral axes of said structural member and said damper ring, said damper ring having a U-shaped cross section defined by a base portion and sidewalls, and having a plurality of tabs extending radially outwardly from each of said sidewalls and adjacent said flange for restricting relative axial movement between said damper ring and said flange, and said damper ring being disposed radially inward of said flange and dimensioned for enabling centrifugal force to exert a radial force on said damper ring for retaining said damper ring on said flange.

11. An annular structural member, having a neutral axis and an annular extension extending only radially from said structural member and including means effective for damping vibration, comprising in combination said extension and a damper ring having a neutral axis and only a radially facing, annular recess therein for receiving, and thereby being mounted on, said extension.

12. The structural member of claim 11 wherein said damper ring is split and includes a plurality of tabs extending radially therefrom and adjacent said extension for restricting relative axial movement between said damper ring and said extension.

13. The means effective for damping vibration according to claim 1, wherein said extension protrudes substantially radially inwardly, said damper ring is disposed radially inwardly of said extension, and said annular recess faces radially outwardly.

14. The means effective for damping vibration according to claim 1, wherein said structural member comprises a rotatable structural member and said damper ring is rotatable therewith.

* * * * *